(12) United States Patent
Parchami

(10) Patent No.: US 9,575,220 B2
(45) Date of Patent: Feb. 21, 2017

(54) DEVICE FOR A MOTOR VEHICLE INCLUDING AN OPTICAL AREA SENSOR HAVING AN OPTICAL SEMIAXIS AND AN OPTICAL SYSTEM HAVING AN APERTURE ANGLE AND USE OF THE DEVICE IN A VEHICLE

(71) Applicant: Robert Bosch GmbH, Stuttgart (DE)

(72) Inventor: Marzieh Asadeh Parchami, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/882,900

(22) Filed: Oct. 14, 2015

(65) Prior Publication Data

US 2016/0103251 A1    Apr. 14, 2016

(30) Foreign Application Priority Data

Oct. 14, 2014  (DE) ..................... 10 2014 220 765

(51) Int. Cl.

| | |
|---|---|
| *G02B 3/00* | (2006.01) |
| *H04N 7/18* | (2006.01) |
| *H04N 5/225* | (2006.01) |
| *G02B 27/00* | (2006.01) |
| *B60R 11/04* | (2006.01) |

(52) U.S. Cl.
CPC ............ *G02B 3/0087* (2013.01); *B60R 11/04* (2013.01); *G02B 27/0025* (2013.01); *H04N 5/2254* (2013.01); *H04N 7/18* (2013.01)

(58) Field of Classification Search
CPC .... G02B 27/0025; G02B 3/0087; B60R 11/04
USPC ......................................... 359/654; 348/148
See application file for complete search history.

(56) References Cited

U.S. PATENT DOCUMENTS

2003/0010890 A1    1/2003   Sakata

FOREIGN PATENT DOCUMENTS

| | | |
|---|---|---|
| DE | 1020080270307 | 12/2009 |
| DE | 102009027520 A1 | 1/2011 |

*Primary Examiner* — William Choi
(74) *Attorney, Agent, or Firm* — Gerard Messina

(57) ABSTRACT

A device is provided, which includes at least one optical area sensor having an optical semiaxis and an entrance pupil. The device also includes an optical element including at least one pair of parallel surfaces. The device is characterized in that the optical element has a refractive index which decreases as the distance from the center increases at least along a direction in parallel to the surfaces at least between one edge of the optical element and a center of the optical element. The optical element is situated with respect to the area sensor in such a way that the surfaces are situated perpendicularly to the optical semiaxis. The increase of the refractive index perpendicular to the optical semiaxis makes it possible to situate the optical element having the parallel surfaces perpendicular to the optical semiaxis, so that the block requires minimal installation space.

11 Claims, 7 Drawing Sheets

DEVICE FOR A MOTOR VEHICLE INCLUDING AN OPTICAL AREA SENSOR HAVING AN OPTICAL SEMIAXIS AND AN OPTICAL SYSTEM HAVING AN APERTURE ANGLE AND USE OF THE DEVICE IN A VEHICLE

FIELD OF THE INVENTION

The present invention relates to a device for a motor vehicle, which includes at least one optical area sensor having an optical semiaxis and an entrance pupil. Examples of such area sensors are video and fixed image sensors. Such a device may be used, for example, in a vehicle and/or may be included in it.

BACKGROUND INFORMATION

Devices including an optical area sensor (imager) and an entrance pupil are used, for example, as front cameras in vehicles. In this case, the device is situated in an area with respect to a longitudinal axis of the vehicle behind a windshield of the vehicle in such a way that the optical semiaxis crosses the windshield and the device thus visually records a wider area with respect to the longitudinal axis in front of the windshield of the vehicle and in particular ahead of the vehicle.

An aperture angle is defined by an extension of the surface sensor and a distance between the area sensor and the entrance pupil. The device may in addition include one or multiple imaging optical system(s).

The recorded images and/or videos may be used in diverse ways. They may be displayed, for example, on a screen for supporting the driver, and/or they may be evaluated automatically, for example, by a driver assistance system, which determines the distance to a preceding vehicle.

Vehicles are described in an axis system, a longitudinal axis extending horizontally and in parallel to a direction of travel of the vehicle, and a vertical axis extending vertically. A transverse axis extends perpendicularly to the longitudinal axis and perpendicularly to the vertical axis. The transverse and longitudinal axes define a horizontal plane, to which the windshield is inclined at an angle differing from 0° and 90°, 360° corresponding to the complete circle. The inclination may vary along the vertical axis and/or along the transverse axis.

A distance of the device from the windshield and the aperture angle determine a field of vision of the windshield, through which the device "sees," and which must therefore be transparent if the full aperture angle is to be utilized.

The device may be accommodated, for example, in the foot of a center rear view mirror, it being possible for the foot to be attached to the windshield. The windshield area in which the foot is attached may partially include so-called black print. However, the field of vision must be kept free from black print if the full aperture angle is to be utilized.

It is desirable to design the field of vision to be as small as possible to minimize the visibility of the device from the outside, to reduce the effect of the windshield as an enlarging ancillary lens and/or to maximize the black print.

If the full aperture angle is to be utilized, this may occur, for example, by reducing the distance of the device from the windshield. However, a structural dimension of the device requires a minimum distance. Furthermore, it is possible to minimize the angle between the optical semiaxis and a normal of the windshield. However, it is desirable to keep the optical axis parallel to the horizontal plane of the vehicle. However, the optical semiaxis of the area sensor then crosses the windshield in such a way that it is inclined in relation to a normal of the windshield corresponding to the inclination.

If the device having a horizontal optical semiaxis is situated at the minimum distance to the windshield, this also causes the field of vision to be further reduced in that an optical element is situated between the device and the windshield. Thus DE 10 2008 0270 307 A1 describes an optical element in the form of a prism system, which has at least two prisms made from transparent materials situated one behind the other, the prisms being oriented in such a way that they have opposite refraction directions and their surfaces facing one another do not extend in parallel to one another. US 2003/0010890 A1 concerns a glass block which is introduced in front of a camera at an angle.

SUMMARY

The inventors have found that the field of vision may be further reduced in the case of a given minimal distance.

The device according to the present invention includes an optical area sensor having an optical semiaxis, an entrance pupil and an optical element including at least one pair of parallel surfaces. The device is characterized in that the optical element has a refractive index which decreases as the distance from the center increases at least along a direction in parallel to the surfaces at least between one edge of the optical element and a center of the optical element. The optical element is situated with respect to the area sensor in such a way that the surfaces are situated perpendicularly to the optical semiaxis.

The increase of the refractive index perpendicular to the optical semiaxis makes it possible to situate the optical element having the parallel surfaces perpendicularly to the optical semiaxis, so that the block requires minimum installation space.

In one preferred specific embodiment, the refractive index between the center and an opposite edge of the optical element increases as the distance from the center increases.

It is then possible to obtain a particularly strong reduction of the field of vision.

It is also possible that the refractive index is constant between the center and an opposite edge of the optical element.

A significant reduction of the field of vision may be achieved in a lower area, which is further distant with respect to an average distance of the optical semiaxis. It is therefore sufficient if the refractive index varies in this area.

The refractive index may increase or decrease linearly as the distance from the center increases. The optical element may then be manufactured in a particularly simple manner.

The optical semiaxis may coincide with the center of the optical element.

The optical axis may coincide with the opposite edge of the optical element. It is sufficient if the refractive index varies in the lower area.

The optical element may have refractive indices greater than 1.3 in the direction. The optical element may have refractive indices smaller than 1.8, preferably smaller than 1.6, in the direction. These refractive index limits have proven to be favorable in tests.

In another direction, which is perpendicular to the optical semiaxis and the direction, the optical element may be formed without a refractive index change. The optical element may then be manufactured in a particularly simple manner.

The use introduced according to the present invention in the motor vehicle, which includes a windshield and a vertical axis, is the arrangement of the device according to the present invention, so that the optical semiaxis crosses the windshield and is inclined in relation to a normal of the windshield at an angle different from 0° and from 90° and the direction lies in a plane spanned by the optical axis and the normal.

Thus the device may be integrated, requiring little space, into a foot of a center rear view mirror, which stands on the windshield in a black print area, an area left transparent as a field of vision of the device being reduced within the black print area.

Advantageous refinements of the present invention are provided in the subclaims and explained in the description.

DETAILED DESCRIPTION

Figure 1:
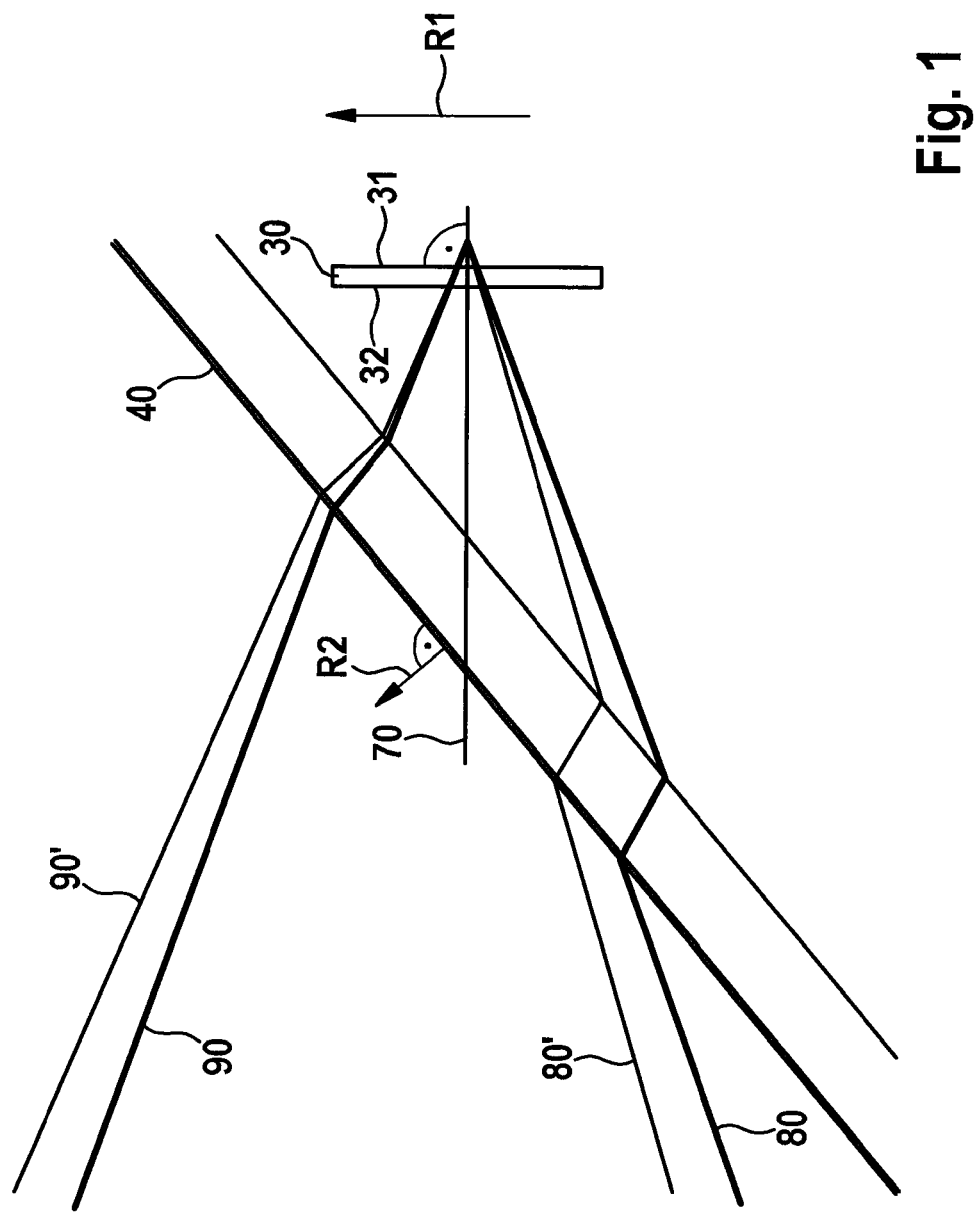
FIG. 1 shows, in exemplary fashion, optical paths through a windshield with and without an optical element including at least one refractive index along a direction at least between one edge of the optical element and a center of the optical element, which decreases as the distance from the center increases.

Optical paths through a windshield with and without an optical element including at least one refractive index along a direction at least between one edge of the optical element and a center of the optical element, which decreases as the distance from the center increases, are shown as an example in FIG. 1.

An optical element 30 having a pair of parallel surfaces 31, 32 is situated with respect to a windshield 40 in such a way that a direction R1 parallel to surfaces 31, 32, along which the refractive index decreases as the distance from the center increases, extends neither in parallel nor perpendicularly to a normal R2 of the windshield. Such an optical element 30 is manufacturable, for example, as gradient-index glass and is then also denoted as an index glass block. Gradient-index glass, for example, is manufacturable using ion diffusion processes and may have, for example, a linear or parabolic refractive index curve.

FIG. 1 shows how optical element 30 influences the optical path of a camera including an area sensor and an entrance pupil, the optical semiaxis 70 of which is perpendicular to direction 50. As a result, a lower marginal ray 80, 80' of the aperture angle travels a longer distance back to windshield 40 than an upper marginal ray 90, 90' of the aperture angle. The presence of optical element 30 causes marginal rays 80', 90' to strike higher on windshield 40 than marginal rays 80, 90 which are not deflected by an optical element. In this case, lower marginal beam 80' is raised higher in relation to marginal beam 80 than upper marginal beam 90' is raised in relation to marginal beam 90, so that, along the direction, field of vision 45, 45' of windshield 40, through which the camera "sees," is reduced in the presence of optical element 30. Field of vision 45' is vertically compressed in relation to field of vision 45. The degree and nature of the compression may be determined by the selection of the refractive index curve. Furthermore, the size of the field of vision to be kept clear and an incidence point of the lower marginal ray onto the street ahead of the vehicle may be determined by the selection of the refractive index curve.

Figure 2:
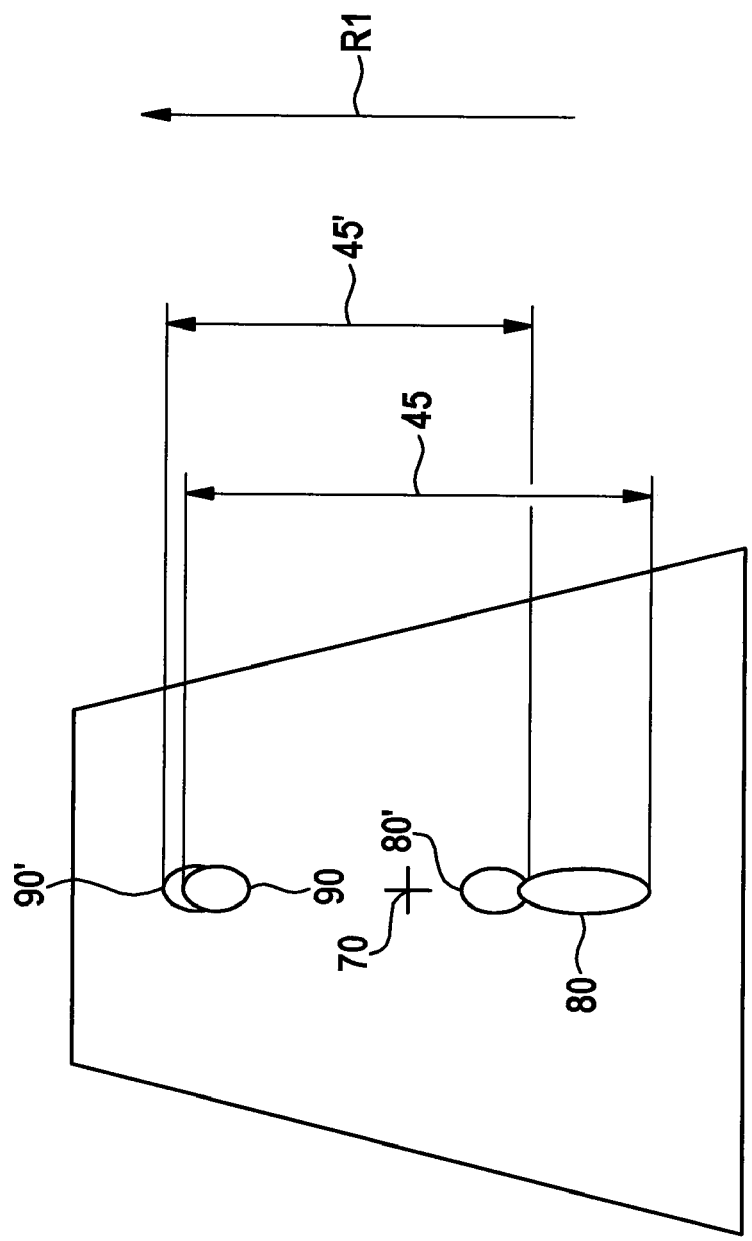
FIG. 2 shows, in exemplary fashion, a reduction of the height of a field of vision.

This is, for example, shown in FIG. 2 in a top view along optical semiaxis 70 onto windshield 40.

Figure 3:
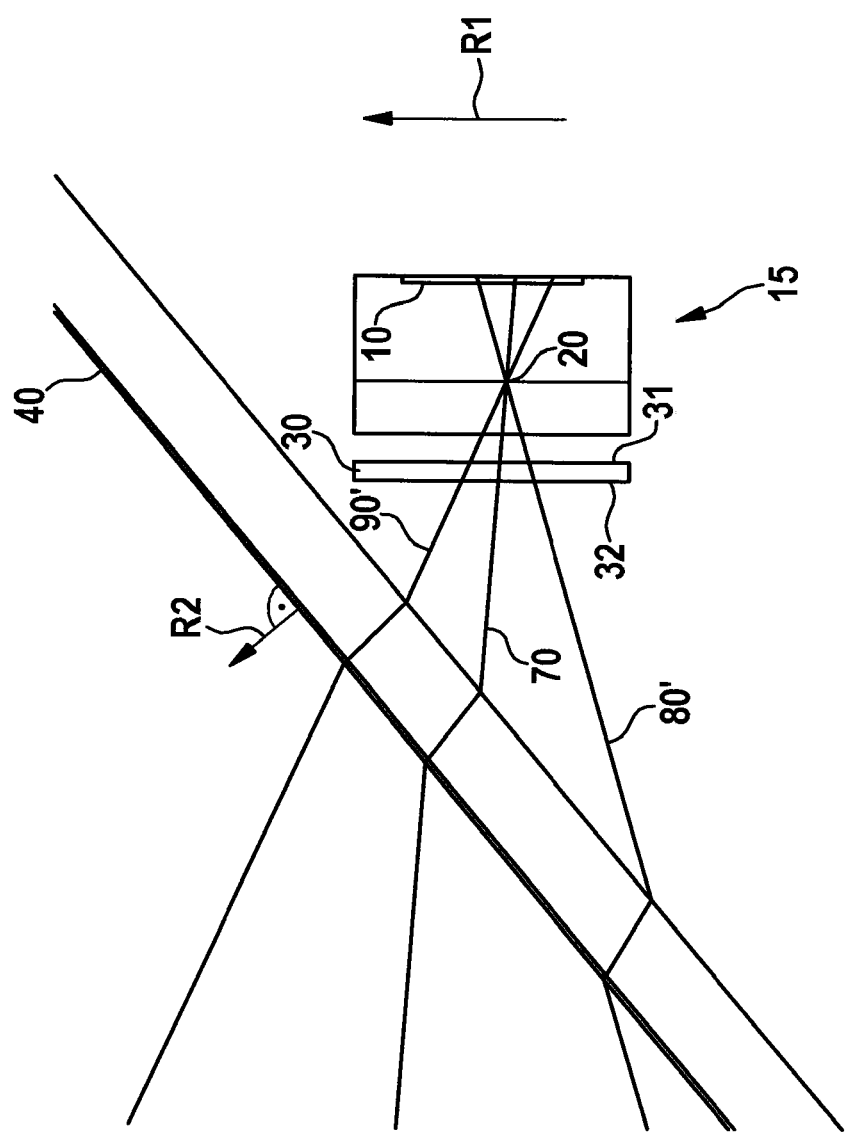
FIG. 3 shows, in exemplary fashion, optical paths through a windshield and a device according to the present invention according to a first exemplary embodiment.

AS an example, FIG. 3 shows optical paths through a windshield and a device according to the present invention according to a first exemplary embodiment. The refractive index curve of optical element 30 may be shown, for example, as in FIG. 5, in FIG. 6 or in FIG. 7.

Figure 5:
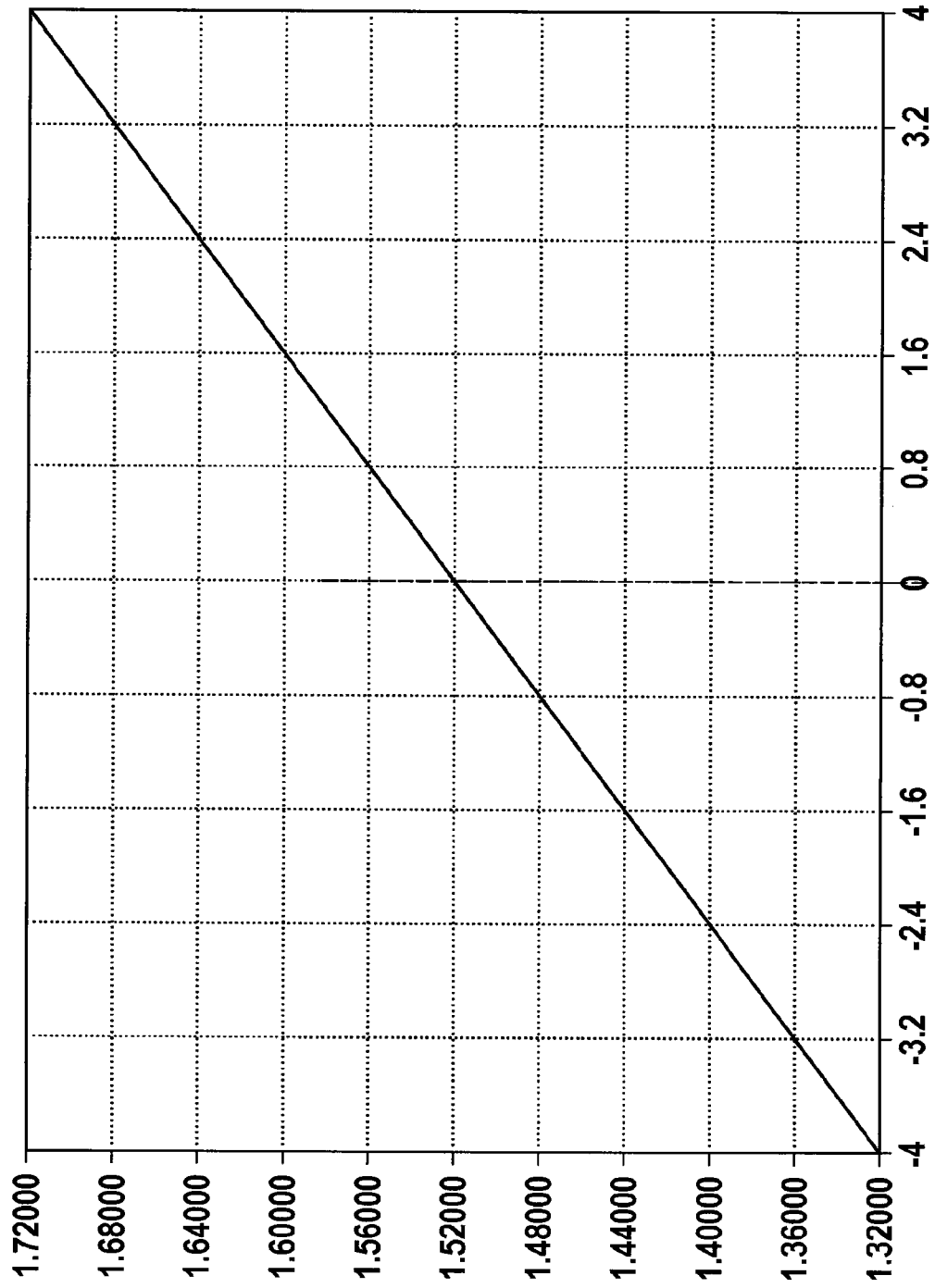
FIG. 5 shows, in exemplary fashion, a first exemplary refractive index curve.
Figure 6:
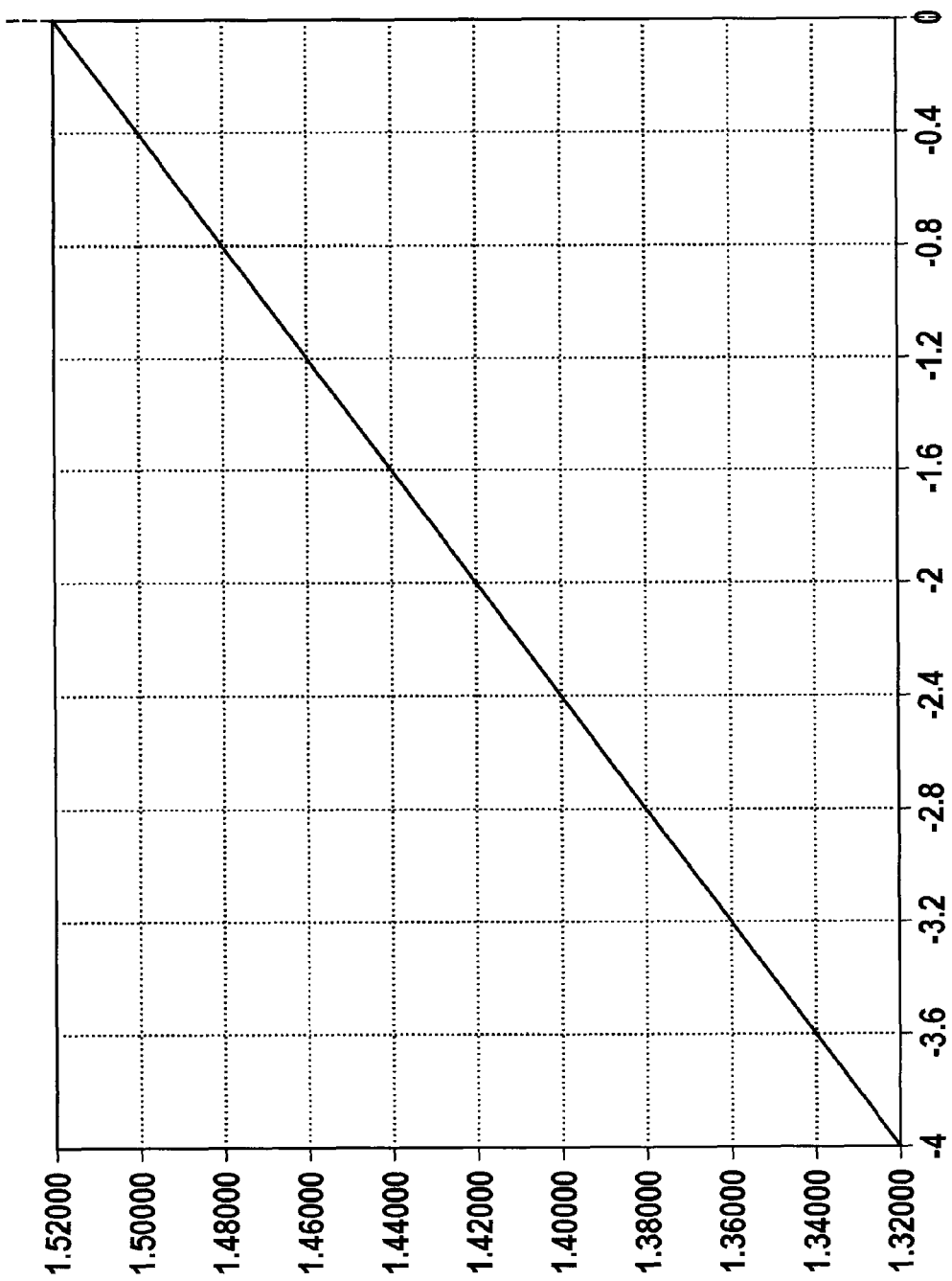
FIG. 6 shows, in exemplary fashion, a second exemplary refractive index curve.
Figure 7:
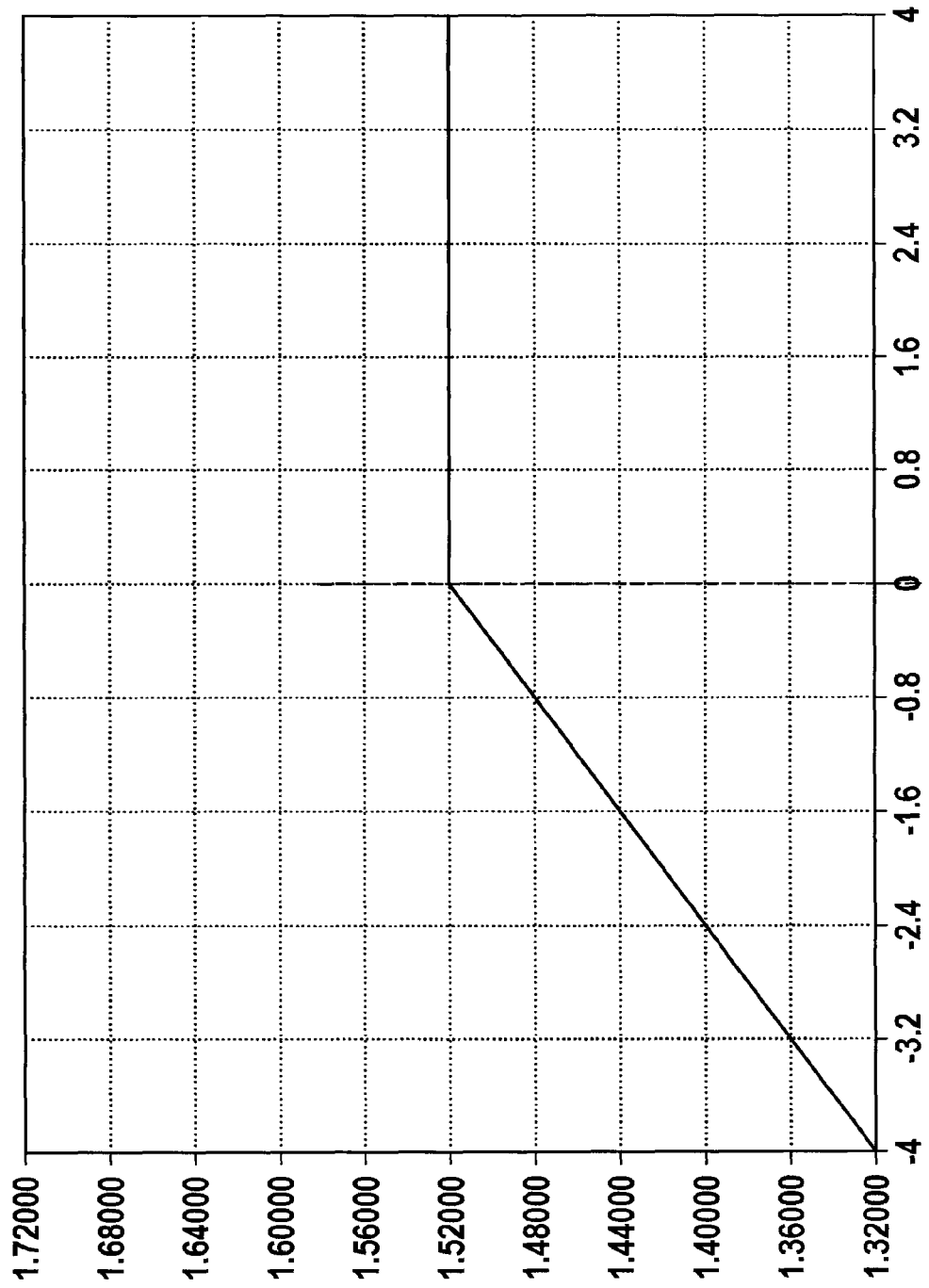
FIG. 7 shows, in exemplary fashion, a third exemplary refractive index curve.

In FIGS. 5, 6 and 7 the abscissas denote the distance in millimeters from the center of optical element 30, the center being symbolized by the dashed line in FIGS. 5 and 7, and the ordinates denote the refractive index. In FIG. 6, the center lies on the right margin of the diagram.

In FIG. 3, a center of optical element 30 coincides with optical semiaxis 70 of an optical area sensor 10 of a camera 15, an entrance pupil 20 being situated between the optical area sensor and the optical element, the distance of the entrance pupil to area sensor 10 together with a size of area sensor 10 determining an aperture angle between marginal rays 80', 90'.

Figure 4:
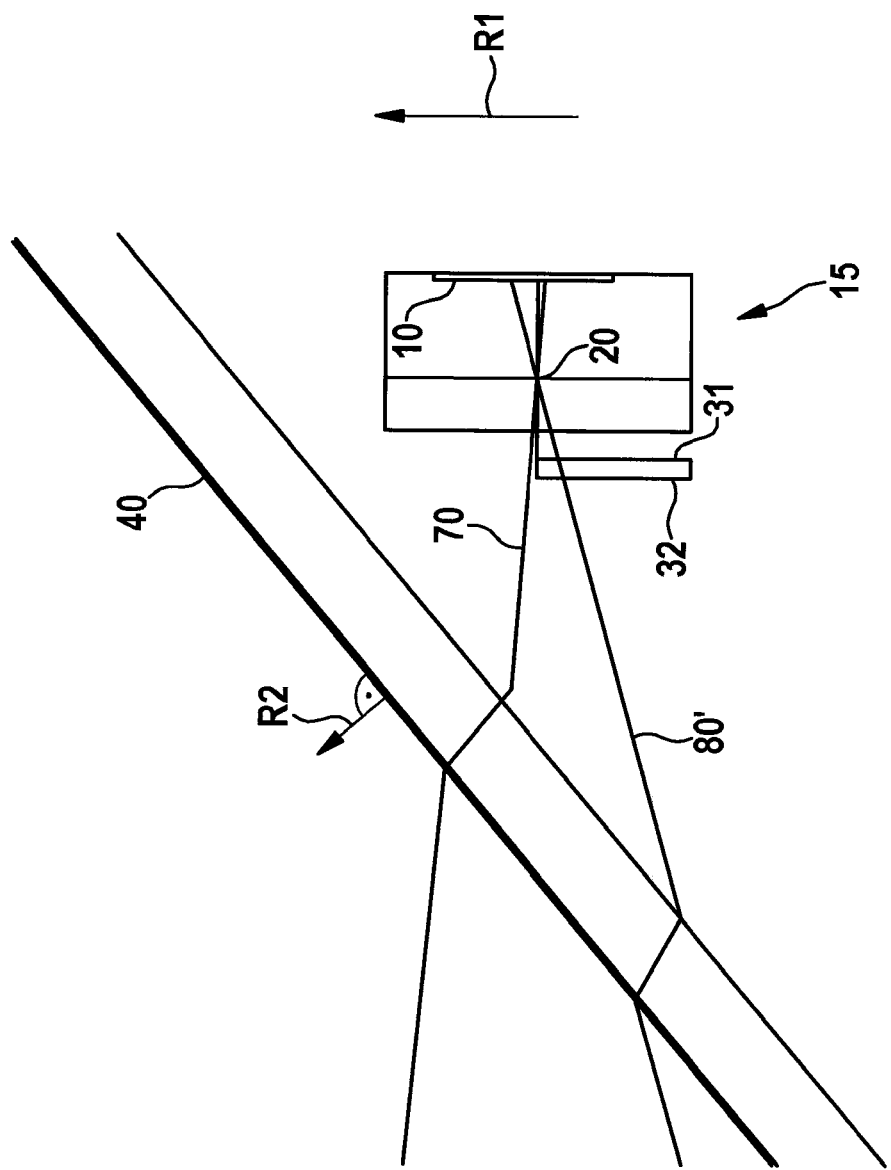
FIG. 4 shows, in exemplary fashion, optical paths through a windshield and a device according to the present invention according to a second exemplary embodiment.

As an example, FIG. 4 shows optical paths through a windshield 40 and a device according to the present invention according to a second exemplary embodiment. The refractive index curve of optical element 30 may be shown, for example, as in FIG. 5 or in FIG. 6.

In FIG. 4, an upper edge of optical element 30 coincides with optical semiaxis 70.

In FIGS. 1, 2, 3 and 4, direction R1, in which the refractive index shows a changeable curve, is situated in parallel to the vehicle vertical axis. The optical semiaxis is situated in parallel to the vehicle longitudinal axis. The present invention is, however, not limited to such an arrangement.

In a further direction in parallel to the surfaces, which is perpendicular to the direction, the refractive index may be constant. The refractive index thus shows no change along the further direction.

An index glass block, which may be used to implement the present invention, may be situated directly in front of a camera 15 and may be a part of camera 15. The parallel surfaces may have a shorter distance of less than 5 mm, preferably 1 mm. The minor thickness causes the index glass block to have only a slight influence on the imaging error of the system.

As shown in FIGS. 5 and 6, the refractive index may show a constant change along the direction across the entire index glass block. The refractive index may change in a range between 1.3 and 1.8, or between 1.3 and 1.6. For example, all refractive indices lie between 1.32 and 1.52, or between 1.32 and 1.72.

As shown in FIG. 7, the change may also be limited to a half of the index glass block. From one edge to the center, the refractive index then increases, for example from 1.32 to 1.52. From the center to the opposite edge, the refractive index remains constant, however, at 1.52.

Using the refractive index curves presented by way of example, reductions of the field of vision of up to 16% were achieved.

The index glass block may be situated in front of a lens of the camera at a distance of a few millimeters, approximately 1 mm to 10 mm, or integrated into the design of the optical system as a first optical surface. This integration may occur during the manufacture of the camera. This has the advantage that the correct position of the index glass block to the optical semiaxis is easily ensured during manufacturing and may then be fixed, making it unnecessary for this to be ensured during installation into the vehicle. Furthermore, effects of the optical element may already be detected as part of a camera test.

During installation in the vehicle, it must only be ensured that the direction, in which the index glass block has a dependence of the refractive index on the distance from the center, is preferably parallel to the vertical axis of the vehicle in a tolerance window of, for example, +/−3°.

The diameter of the index glass block may be similar or identical to a front lens of the camera. The diameter may amount to, for example, 8 mm to 12 mm.

What is claimed is:

1. A device for a motor vehicle, comprising:
   an optical area sensor;
   an optical semiaxis;
   an entrance pupil; and
   an optical element including at least one pair of parallel surfaces, wherein:
      the optical element has a refractive index which decreases as a distance from a center of the optical element increases at least along a direction in parallel to the parallel surfaces at least between one edge of the optical element and the center of the optical element, and
      the optical element is situated with respect to the area sensor in such a way that the parallel surfaces are situated perpendicularly to the optical semiaxis.

2. The device as recited in claim 1, wherein the refractive index between the center and an opposite edge of the optical element increases as the distance from the center increases.

3. The device as recited in claim 1, wherein the refractive index is constant between the center and an opposite edge of the optical element.

4. The device as recited in claim 1, wherein the refractive index changes constantly with the distance from the center.

5. The device as recited in claim 1, wherein the optical semiaxis coincides with the center of the optical element.

6. The device as recited in claim 2, wherein the optical semiaxis coincides with the opposite edge of the optical element.

7. The device as recited in claim 1, wherein the optical element has refractive indices greater than 1.3 in the direction.

8. The device as recited in claim 1, wherein the optical element has refractive indices smaller than 1.8 in the direction.

9. The device as recited in claim 1, wherein the optical element has refractive indices smaller than 1.6 in the direction.

10. The device as recited in claim 1, wherein the optical element has no refractive index change in another direction which is parallel to the surfaces and is perpendicular to the direction.

11. A method of using a device in a motor vehicle, the device including an optical area sensor; an optical semiaxis; an entrance pupil; and an optical element including at least one pair of parallel surfaces, wherein the optical element has a refractive index which decreases as a distance from a center of the optical element increases at least along a direction in parallel to the parallel surfaces at least between one edge of the optical element and the center of the optical element, and the optical element is situated with respect to the area sensor in such a way that the parallel surfaces are situated perpendicularly to the optical semiaxis, the vehicle having a vertical axis and a windshield, the method comprising:
    arranging the device so that the optical semiaxis crosses the windshield and is inclined in relation to a normal of the windshield at an angle different from 0° and from 90°, wherein the direction lies in a plane spanned by the optical semiaxis and the normal.

* * * * *